United States Patent
Urano et al.

(10) Patent No.: US 9,116,272 B2
(45) Date of Patent: Aug. 25, 2015

(54) LIGHTING DEVICE, LIQUID CRYSTAL DISPLAY DEVICE, AND ELECTRONIC APPARATUS

(75) Inventors: Nobutaka Urano, Chino (JP); Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 401 days.

(21) Appl. No.: 13/553,178

(22) Filed: Jul. 19, 2012

(65) Prior Publication Data
US 2013/0027967 A1    Jan. 31, 2013

(30) Foreign Application Priority Data

Jul. 25, 2011 (JP) ................................ 2011-161709

(51) Int. Cl.
| F21V 7/04  | (2006.01) |
| F21V 1/00  | (2006.01) |
| F21V 11/00 | (2015.01) |
| F21V 8/00  | (2006.01) |

(52) U.S. Cl.
CPC ............ G02B 6/0065 (2013.01); G02B 6/0036 (2013.01); *G02B 6/009* (2013.01); *G02B 6/0043* (2013.01); *G02B 6/0068* (2013.01); *G02B 6/0078* (2013.01); *G02B 6/0085* (2013.01)

(58) Field of Classification Search
CPC .. G02B 6/0036; G02B 6/0091; G02B 6/0043; G02B 6/009; G02B 6/0068
USPC ......... 362/626, 602, 608, 625, 628, 615, 236, 362/249.02
See application file for complete search history.

(56) References Cited

U.S. PATENT DOCUMENTS

| 5,134,549 A * | 7/1992 | Yokoyama .................... 362/623 |
| 6,979,112 B2 * | 12/2005 | Yu et al. ........................ 362/600 |
| 7,602,551 B2 * | 10/2009 | Chi et al. ...................... 359/599 |
| 7,690,811 B2 * | 4/2010 | Durvasula et al. ............ 362/246 |
| 2008/0025686 A1 | 1/2008 | Lee et al. |
| 2008/0316771 A1 | 12/2008 | Mori et al. |
| 2009/0147353 A1 * | 6/2009 | Yang et al. .................... 359/350 |
| 2010/0118514 A1 | 5/2010 | Cho et al. |
| 2010/0193978 A1 | 8/2010 | Lee et al. |
| 2010/0302805 A1 * | 12/2010 | Jeong et al. ................... 362/612 |
| 2011/0037920 A1 * | 2/2011 | Kim et al. ....................... 349/58 |

FOREIGN PATENT DOCUMENTS

| JP | A-2004-165124 | 6/2004 |
| JP | 2008/015448 A | 1/2008 |
| JP | A-2009-3081 | 1/2009 |
| JP | A-2010-118348 | 5/2010 |
| JP | A-2011-40388 | 2/2011 |

* cited by examiner

*Primary Examiner* — Hargobind S Sawhney
*Assistant Examiner* — William N Harris
(74) *Attorney, Agent, or Firm* — Oliff PLC

(57) ABSTRACT

In a light guide plate used in a lighting device, light-emitting elements are arranged at first intervals. However, the light emitting elements are partly arranged at second interval which is larger than the first intervals. Therefore, a rectangular shaped second diffusing areas formed by grooves are provided in an outer edge area arranged between a first diffusing area having a plurality of grooves (diffusing pattern) formed thereon and an end portion of the light guide plate so as to have a width smaller than the second intervals so as to face areas in which the light emitting elements are arranged at the second intervals.

17 Claims, 9 Drawing Sheets

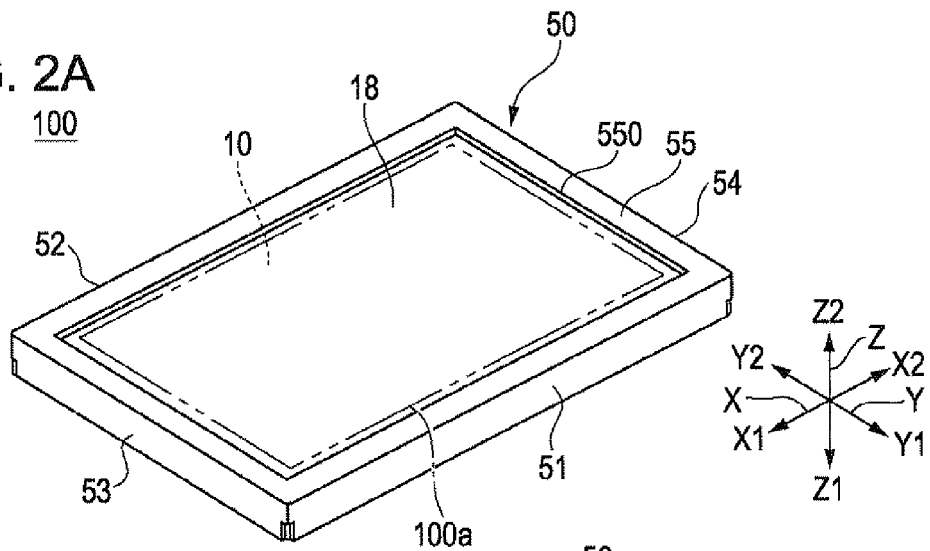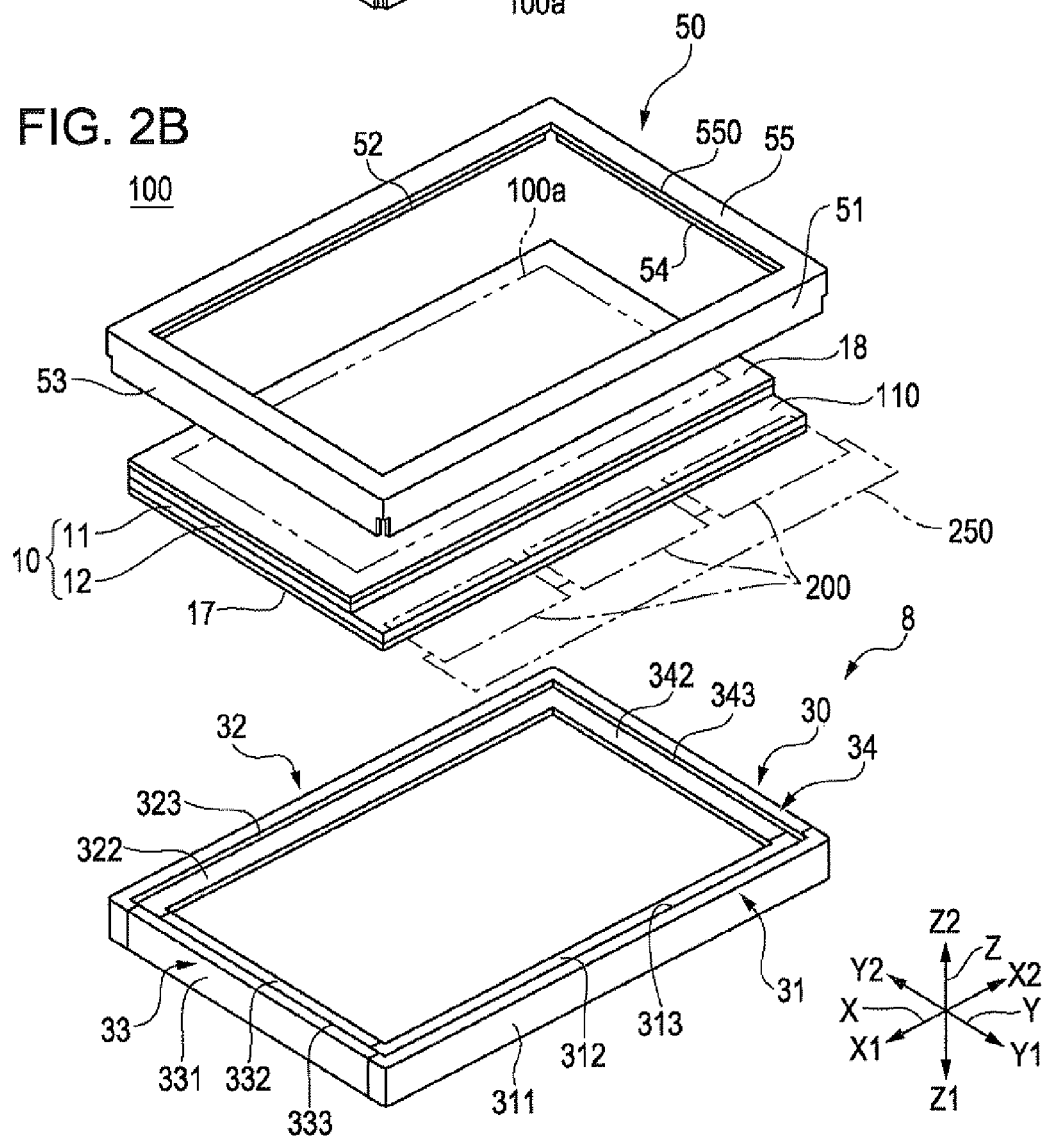

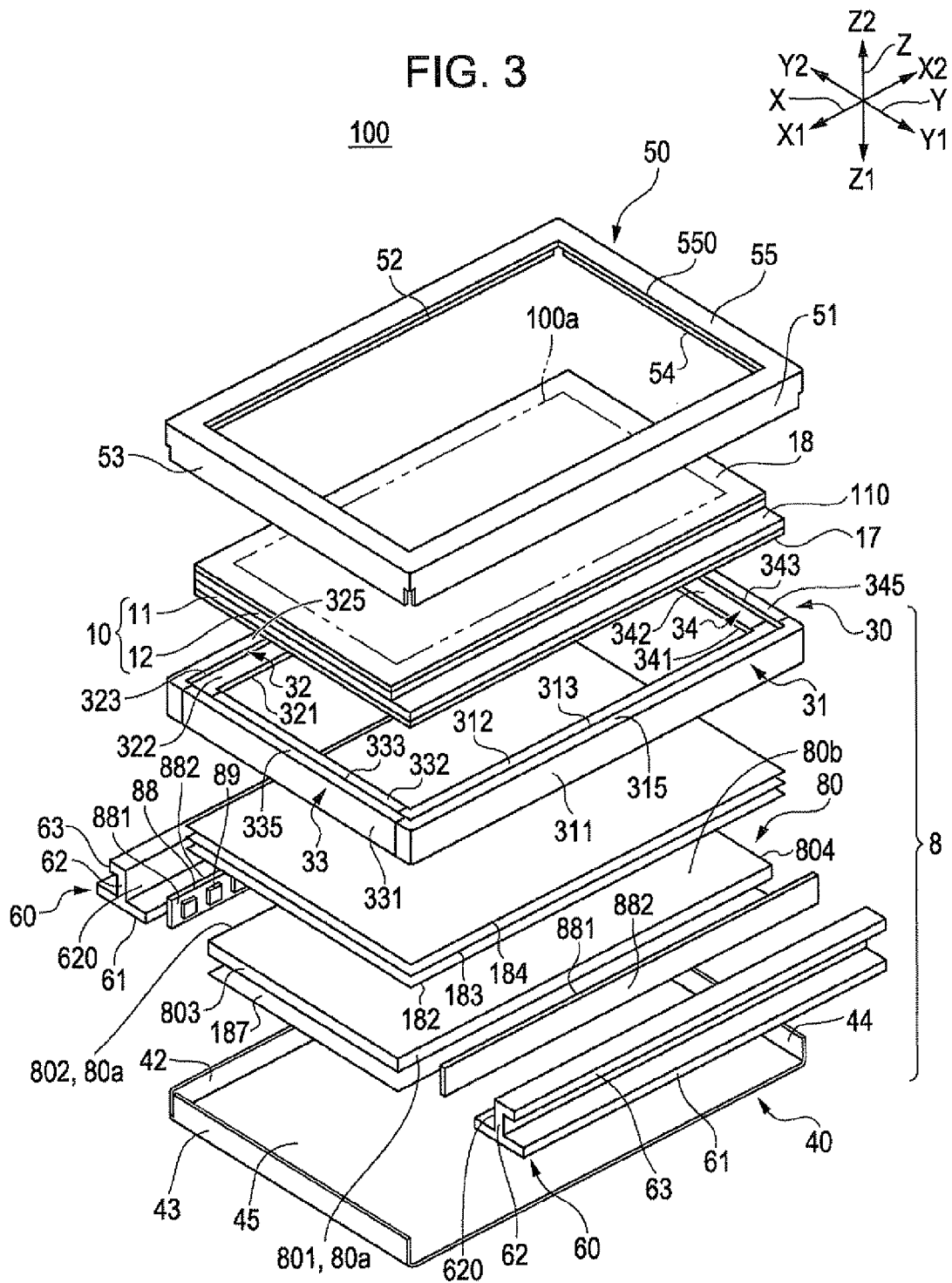

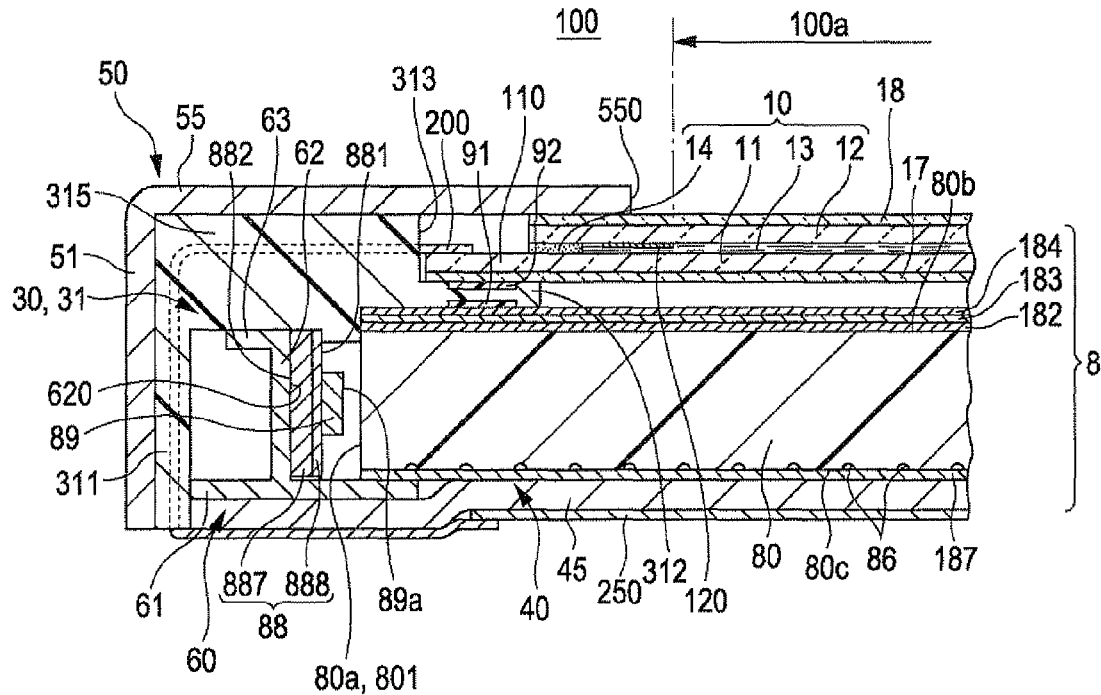
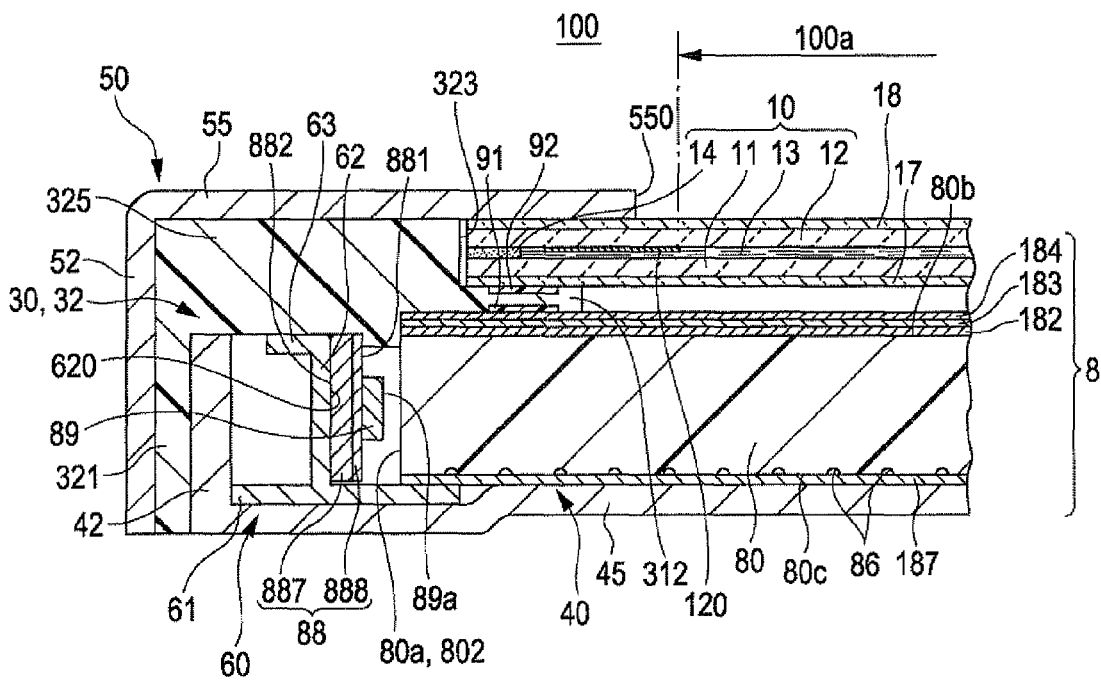

LIGHTING DEVICE, LIQUID CRYSTAL DISPLAY DEVICE, AND ELECTRONIC APPARATUS

BACKGROUND

1. Technical Field

The present invention relates to a lighting device having a light guide plate and light-emitting elements, a liquid crystal display device having the lighting device, and an electronic apparatus having the liquid crystal display device.

2. Related Art

A liquid crystal display device having a transmissive liquid crystal panel includes a lighting device having a plurality of light-emitting elements arranged along a side end surface of a light guide plate which corresponds to a light incident portion, and the liquid crystal panel is arranged on the side of a light exit surface of the light guide plate so as to be stacked thereon (JP-A-2010-118348, JP-A-2004-165124, JP-A-2009-3081, and JP-A-2011-40388).

In a lighting device disclosed in JP-A-2011-40388 from among JP-A-2010-118348, JP-A-2004-165124, JP-A-2009-3081, and JP-A-2011-40388, light emitting elements are mounted on a first side end surface side of a power source substrate, and the power source substrate is fixed to a frame via screws or the like.

In such a lighting device, for the purpose of enhancing a light outgoing efficiency of illuminating light from the light guide plate and also uniformizing an intensity distribution of the illuminating light, a plurality of diffusing patterns including white dots or grooves are formed on the light guide plate on the light exit surface side or on a surface opposite the light exit surface side in an area overlapping an image display area of a liquid crystal panel. Therefore, the light guide plate is provided with a diffusing area on which the diffusing patterns are formed and an outer edge area arranged between the diffusing area and end portions of the light guide plate, and the diffusing pattern is not formed in the outer edge area.

In contrast, the majority of the light-emitting elements are mounted on the light source substrate at regular intervals. However, portions in which the light-emitting elements are arranged at larger intervals may be formed. For example, when the light source substrate is fixed to the frame with the screws secured between the light-emitting elements, the intervals of the light-emitting elements in areas where the screws are arranged are larger than other portions. When a plurality of light source substrates are arranged, the intervals of the light-emitting elements are larger between adjacent light source substrates than in other portions. Consequently, at a time point when light emitted from the light-emitting elements enters the diffusing area on the light guide plate, the portions in which the intervals of the light-emitting elements are large become discontinuous portions having a light intensity lower than in portions peripheral thereto, which may disadvantageously deteriorate the intensity distribution of illuminating light. Such a problem is hard to solve even when the density of the diffusing patterns in the diffusing area is adjusted properly.

SUMMARY

An advantage of some aspects of the invention is that there is provided a lighting device which is capable of enhancing the uniformity of the outgoing intensity of illuminating light from a light guide plate even when there exist portions in which the intervals of light-emitting elements are large, a liquid crystal display device having the lighting device, and an electronic apparatus having the liquid crystal display device.

There is provided a lighting device including: a light guide plate which includes a first main surface, a second main surface which is opposite to the first main surface, and a plurality of side end surfaces each of which intersect with the first main surface and the second main surface; and a plurality of light-emitting elements arranged along a first side end surface among the plurality of side end surfaces; wherein the first main surface includes a first diffusing area on which a plurality of first diffusing patterns are formed and an outer edge area arranged between the first diffusing area and the first side end surface, the plurality of light emitting elements include a first light emitting element, a second light emitting element, and a third light emitting element, the first light emitting element is adjacent to the second light emitting element with a first interval and the second light emitting element is adjacent to the third light emitting element with a second interval which is larger than the first interval, and a second diffusing area formed corresponding to the second interval on the outer edge area, and a dimension of the second diffusing area in a direction of arrangement of the light-emitting elements is smaller than the second interval.

In the lighting device according to the invention, the portions formed by the plurality of light emitting elements include portions in which the intervals between the adjacent light-emitting elements is first intervals, and the portions in which the adjacent light-emitting elements are arranged at second intervals larger than the first intervals. However, in the outer edge area of the light guide plate, there is the second diffusing area formed by the diffusing pattern between the first diffusing area and the portions of the second intervals. Therefore, at the time point when the light emitted from the light-emitting elements enters the light guide plate, the portions in which the intervals of the light-emitting elements are larger than other portions are discontinuous portions having a light intensity lower than the periphery. However, at the time point when the light enters the first diffusing area, the difference in light intensity from the periphery is alleviated by the diffusing pattern formed on the second diffusing areas even in the portion in which the intervals of the light-emitting elements are larger than other portions. Therefore, even though there exist portions in which the intervals of the light-emitting elements are large, uniformity of the light intensity of the illuminating light going out from the light guide plate may be enhanced.

Preferably, the second main surface is a light emission surface.

Preferably, a plurality of second diffusing patterns are formed on the second diffusing area.

Preferably, the plurality of first diffusing patterns are composed of a plurality of first grooves and the plurality of second diffusing patterns are composed of a plurality of second grooves, a plurality of groove rows each including the plurality of first grooves arranged linearly in a first direction extending in a plane of the first diffusing area are arranged in parallel in a second direction intersecting with the first direction in the plane of the first diffusing area, and the plurality of second grooves are formed in the second diffusing area with a longitudinal direction thereof oriented in the first direction.

Preferably, the first direction is parallel to the first side end surface.

Preferably, the light guide plate with the plurality of first grooves and the plurality of second grooves are formed by irradiating a resin plate with a laser beam.

Preferably, the plurality of light emitting elements further include a fourth light emitting element which is adjacent to the third light emitting element with the first interval.

Preferably, the plurality of light-emitting elements arranged along the first side end surface are divided into at least two groups, the plurality of light-emitting elements arranged along the first side end surface are arranged with the first interval in each of the groups, and the second light emitting element and the third light emitting element belong to different groups.

Preferably, the first diffusing area is surrounded by the outer edge area on the first main surface.

Preferably, the second diffusing area has a rectangular shape.

Preferably, the plurality of light-emitting elements are provided on the first side end surface side of a light source substrate, a structure projecting from the first side end surface side of the light source substrate exists in a region corresponding to a part of the second diffusing area, and the second diffusing area includes a first end portion and a second end portion on a side which is opposed to the structure, the first end portion being opposed to the region and the second end portion being an end portion other than the first end portion, and the first end portion being positioned closer to the first diffusing area than the second end portion. In this configuration, in the portions in which the structures exist, the reflex is excited by the structures and hence the light intensity is increased correspondingly. However, the end portion of the second diffusing area is retracted toward the first diffusing area in the portions facing the structures. Therefore, the difference in light intensity from the periphery may be alleviated efficiently.

Preferably, the second diffusing area has a semi-circular shape with a chord thereof facing the first diffusing area.

Preferably, the second diffusing area has a trapezoidal shape or a triangular shape with a bottom side thereof facing the first diffusing area.

The lighting device to which the invention is applied may be used in a liquid crystal display device, and includes a liquid crystal panel arranged on the second main surface of the light guide plate.

The liquid crystal display device in the invention m used in an electronic apparatus such as a liquid crystal television.

BRIEF DESCRIPTION OF THE DRAWINGS

The invention will be described with reference to the accompanying drawings, wherein like numbers reference like elements.

FIGS. 2A and 2B are explanatory drawings showing a general configuration of the liquid crystal display device according to the first embodiment of the invention.

FIG. 3 is an exploded perspective view of the liquid crystal display device according to the first embodiment of the invention when exploded further into pieces.

FIGS. 4A and 4B are cross-sectional views of the liquid crystal display device according to the first embodiment of the invention.

DESCRIPTION OF EXEMPLARY EMBODIMENTS

Figure 1A:
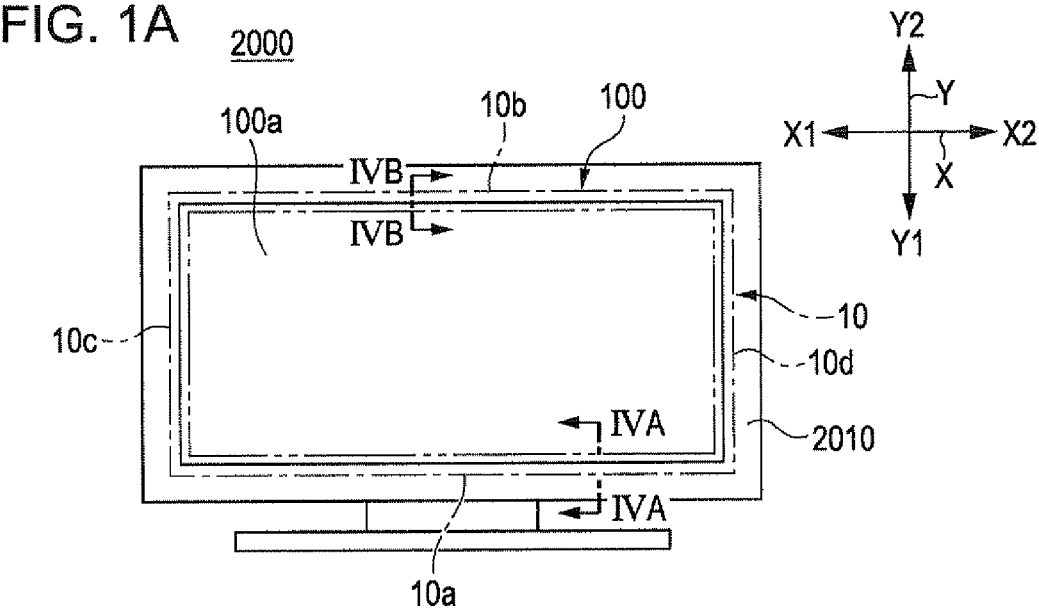
FIGS. 1A and 1B are explanatory drawings showing a liquid crystal television (electronic apparatus) provided with a liquid crystal display device according to a first embodiment of the invention.

Referring now to the drawings, embodiments in which the invention is applied to a liquid crystal display device for a liquid crystal television will be described. In the drawings referenced in the description given below, scaling is differentiated among respective layers or members in order to make the respective layers and members recognizable in the drawing. In the following description, one of directions intersecting each other in a plane of a light guide plate or a liquid crystal panel (the direction in which long sides of the light guide plate and the liquid crystal panel (display panel) illustrated in the drawings extend) is defined as an X-axis direction and the other direction (the direction in which short sides of the light guide plate and the liquid crystal panel illustrated in the drawings extend) is defined as a Y-axis direction, and the direction intersecting the X-axis direction and the Y-axis direction (the direction in which the light guide plate and the liquid crystal panel illustrated in the drawings are laminated) is defined as a Z-axis direction. In the drawings referred to below, one side in the X-axis direction is expressed as an X1 side, the other side is expressed as an X2 side, one side in the Y-axis direction (the direction in which the protruding portion of the liquid crystal panel is arranged) is expressed as a Y1 side, the other side facing the Y1 side is expressed as a Y2 side, one side in the Z-axis direction (the direction toward the back surface of the light guide plate) is expressed as a Z1 side (lower side), and the other side facing the Z1 side (the side from which illuminating light and display light go out) is expressed as a Z2 side (upper side).

First Embodiment

General Configuration

Figure 1B:
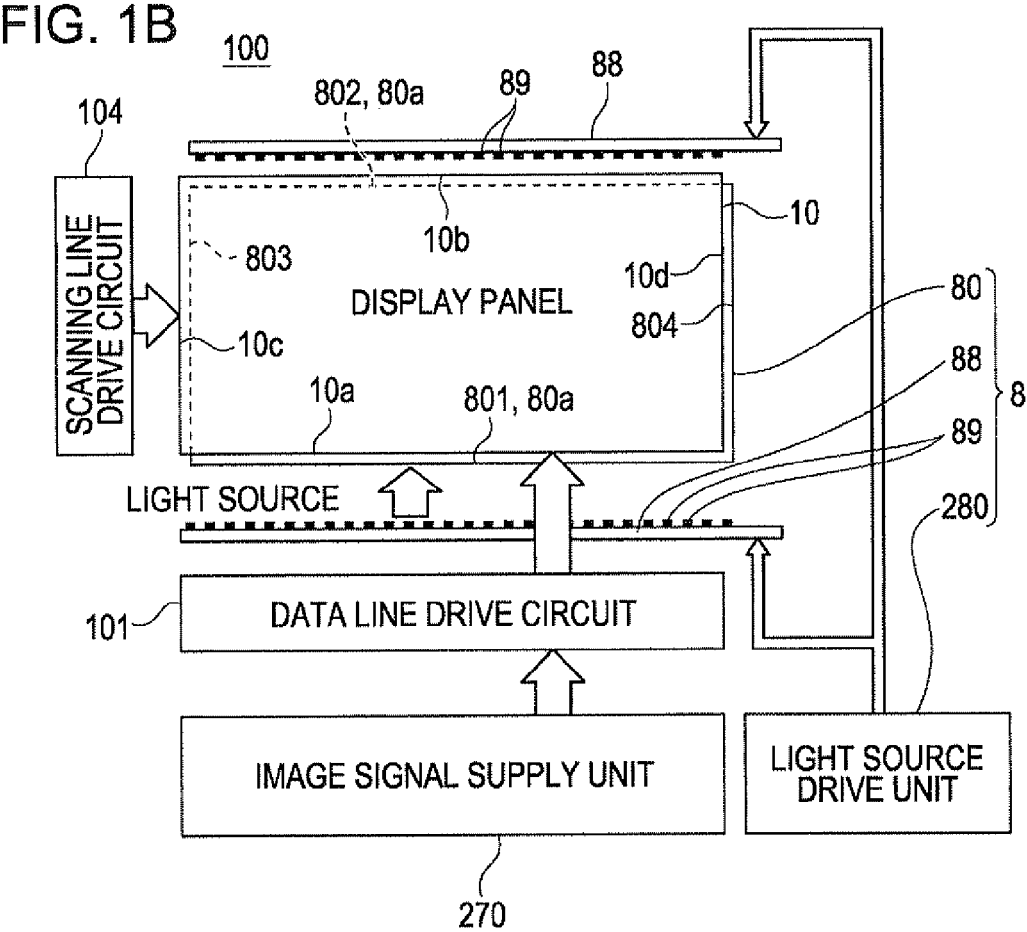

FIG. 1A is an explanatory drawing of a liquid crystal television (electronic apparatus) provided with a liquid crystal display device according to a first embodiment of the invention schematically showing the appearance of the liquid crystal television. FIG. 1B is a block diagram showing an electrical configuration of the liquid crystal display device of the liquid crystal television according to the first embodiment of the invention showing an electrical configuration of the liquid crystal display device.

An electronic apparatus 2000 shown in FIG. 1A is a liquid crystal television, and includes a liquid crystal display device 100 and a frame 2010 for the television. The liquid crystal display device 100 includes a liquid crystal panel 10 (display panel) to be described later, an image signal supply unit 270 configured to supply an image signal to the liquid crystal panel 10, and a lighting device 8 configured to supply illuminating light to the liquid crystal panel 10. The liquid crystal display device 100 includes a scanning line drive circuit 104 configured to drive scanning lines extending in the X-axis direction in the liquid crystal panel 10, and a data line drive circuit 101 configured to drive data lines extending in the Y-axis direction in the liquid crystal panel 10. A configuration in which both of the scanning line drive circuit 104 and the data line drive circuit 101 are integrated into the liquid crystal panel 10 may be employed. A configuration in which one of the scanning line drive circuit 104 and the data line drive circuit 101 is integrated into the liquid crystal panel 10 and the other one is integrated into a drive IC which is mounted on the liquid crystal panel 10 by a COG (Chip on Glass) mounting technology may also be employed. A configuration in which one of the scanning line drive circuit 104 and the data line drive circuit 101 is integrated into the liquid crystal panel 10 and the other one is integrated into the drive IC which is mounted on a circuit board electrically connected to the liquid crystal panel 10 may also be employed. Furthermore, a configuration in which both of the scanning line drive circuit 104 and the data line drive circuit 101 are integrated into the drive IC separate from the liquid crystal panel 10 may be employed.

In this embodiment, the lighting device 8 includes a light guide plate 80 arranged on the liquid crystal panel 10 such that the light guide plate 80 and the liquid crystal panel 10 are stacked one on top of the other, a plurality of light-emitting elements 89 arranged along a side end surface of the light guide plate 80, which corresponds to light incident portion 80a, light source substrates 88 on which the plurality of light-emitting elements 89 are mounted, and a light source drive unit 280 configured to drive the light-emitting elements 89. In this embodiment, the liquid crystal panel 10 has a rectangular shape, and has four sides 10a, 10b, 10c, and 10d. Among the sides 10a, 10b, 10c, and 10d, the side 10a is a long side positioned on the one side Y1 in the Y-axis direction, the side 10b is a long side positioned on the other side Y2 in the Y-axis direction, the side 10c is a short side positioned on the one side X1 in the X-axis direction, and the side 10d is a short side positioned on the other side X2 in the X-axis direction. The light guide plate 80 has four side end surfaces 801, 802, 803, and 804 corresponding to the shape of the liquid crystal panel 10. Among these side end surfaces 801 to 804, the side end surface 801 is positioned on the long side on the one side Y1 in the Y-axis direction, the side end surface 802 is positioned on the long side on the other side Y2 in the Y-axis direction, the side end surface 803 is positioned on the short side on the one side X1 in the X-axis direction, and the side end surface 804 is positioned on the short side on the other side X2 in the X-axis direction. In this embodiment, the two side end surfaces 801 and 802 facing each other in the direction of the short sides (Y-axis direction) from among the four side end surfaces 801, 802, 803, and 804 of the light guide plate 80 correspond to the light incident portions 80a. Therefore, the light-emitting elements 89 are arranged along the two side end surfaces 801 and 802 (the light incident portions 80a) of the light guide plate 80 respectively, and the light source substrates 88 extend along the two side end surfaces 801 and 802 (the light incident portions 80a) of the light guide plate 80 respectively.

Detailed Configuration of Liquid Crystal Display Device 100

FIG. 2A is an explanatory perspective view showing a general configuration of the liquid crystal display device 100 according to the first embodiment of the invention. FIG. 2B is an explanatory exploded perspective view showing the general configuration of the liquid crystal display device 100 according to the first embodiment of the invention. FIG. 3 is an exploded perspective view of the liquid crystal display device 100 according to the first embodiment of the invention when exploded further into more pieces. FIG. 4A is a cross-sectional view of the liquid crystal display device 100 according to the first embodiment of the invention taken along the line IVA-IVA in FIG. 1A, and FIG. 45 is a cross-sectional view of the liquid crystal display device 100 according to the first embodiment of the invention taken along the line IVB-IVB in FIG. 1A.

In FIGS. 2A and 2B, FIG. 3, and FIGS. 4A and 4B, the liquid crystal display device 100 according to this embodiment includes the lighting device 8 referred to as a so-called a back light apparatus, and the transmissive liquid crystal panel 10 arranged so as to be placed on an upper surface of the lighting device 8 so as to be stacked one on top of the other. In the liquid crystal display device 100, the lighting device 8 includes a first frame 40 (lower metal frame) formed of a metal and arranged so as to cover a back surface of the light guide plate 80 on the lower side (the one side Z1 in the Z-axis direction), a second frame 30 (resin frame) formed of a resin and configured to hold an end portion of the liquid crystal panel 10 above the first frame 40 and surround and hold the lighting device 8, and a third frame 50 (upper metal frame) arranged on an upper side (the other side Z2 in the Z-axis direction) of the second frame 30.

The second frame 30 has a rectangular frame shape holding the end portions of the liquid crystal panel 10 and surrounding the periphery of the liquid crystal panel 10 and, in this embodiment, the second frame 30 includes four frame panels 31, 32, 33, and 34 divided into four sides corresponding to four sides of the liquid crystal panel 10. In this embodiment, the second frame 30 has a black color, and hence functions as a light absorbing member, so that generation of stray light in the lighting device 8 is prevented. The frame panels 31, 32, 33, and 34 include side panel portions 311, 321, 331, and 341 extending downward on the outer surface sides of the frame panels 31, 32, 33, and 34, upper panel portions 315, 325, 335, and 345 (end panel portions) bent inward from upper end edges of the side panel portions 311, 321, 331, and 341, and projecting panel portions 312, 322, 332, and 342 protruding inward from midpoints in the height direction of the upper panel portions 315, 325, 335, and 345. Therefore, shouldered portions 313, 323, 333, and 343 are formed by the projecting panel portions 312, 322, 332, and 342 on the inner sides of the frame panels 31, 32, 33, and 34, and the liquid crystal panel 10 is held by the shouldered portions 313, 323, 333, and 343 and the projecting panel portions 312, 322, 332, and 342. Arranged on the lower side of the projecting panel portion 312 are the light guide plate 80 and the light-emitting elements 89 of the lighting device 8.

The first frame 40 is formed by performing a pressing process or the like on a thin metal panel such as an SUS panel. The first frame 40 includes a bottom panel portion 45 and three side panel portions 42, 43 and 44 which extend upright from three sides of an outer peripheral edge of the bottom panel portion 45 except for the one side Y1 in the Y-axis direction, and has a rectangular box shape that is open at the top. The side panel portions 321, 331, and 341 of the second frame 30 overlap the outsides of the side panel portions 42, 43 and 44 of the first frame 40. The side panel portion 311 of the second frame 30 covers the one side Y1 in the Y-axis direction of the first frame 40.

The third frame 50 is formed by performing a pressing process or the like with respect to the thin metal panel such as an SUS panel in the same manner as the first frame 40. The third frame 50 has a rectangular upper panel portion 55 (end panel portion) and four side panel portions 51, 52, 53, and 54 bent downward from outer peripheral edges of the upper panel portion 55, and has a rectangular box shape that opens downward. The side panel portions 51, 52, 53, and 54 overlap the outside of the side panel portions 311, 321, 331, and 341 of the second frame 30. The upper panel portion 55 is formed with a rectangular-shaped window 550 that allows light outgoing from the liquid crystal panel 10 to go out, and the upper panel portion 55 covers the display-light exit side of the liquid crystal panel 10 over the entire circumference of the outer peripheral edge portion.

The third frame 50, the second frame 30, and the first frame 40 configured in this manner are coupled by screws (not shown) or the like and hold the liquid crystal panel 10 and the lighting device 8 on the inner sides thereof. Here, as shown in FIG. 4, flexible sheets 91 and 92 are adhered to lower surfaces and the upper surfaces of projecting panel portions 312, 322, 332, and 342 of the second frame 30. Therefore, when the liquid crystal display device 100 is assembled, the liquid crystal panel 10 is supported by the projecting panel portions 312 to 342 via the flexible sheet 92. When the liquid crystal display device 100 is assembled, the lighting device 8 is supported via the flexible sheet 91. When the liquid crystal display device 100 is assembled, optical sheets (a diffusing sheet 182, prism sheets 183 and 184, or the like) of the lighting device 8 are held via the flexible sheet 91 so that the sheets do to come off or have their positions deviated.

Configuration of Liquid Crystal Panel 10

As shown in FIGS. 2A and 2B, FIG. 3, and FIGS. 4A and 4B, the liquid crystal panel 10 has a square flat shape, and includes an element substrate 11 on which pixel electrodes (not shown) are formed, an opposing substrate 12 arranged so as to face the element substrate 11 at a predetermined clearance, and a rectangular frame-shaped seal member 14 configured to adhere the opposing substrate 12 and the element substrate 11 to each other. In the liquid crystal panel 10 configured in this manner, a liquid crystal layer 13 is held in an area surrounded by the seal member 14. The element substrate 11 and the opposing substrate 12 are translucent substrates such as glass substrates. On the element substrate 11, a plurality of scanning lines (not shown) extend in the X-axis direction, while a plurality of data lines extend in the Y-axis direction, and switching elements (not shown) and pixel electrodes are provided so as to correspond to intersections between the scanning lines and the data lines (not shown).

In this embodiment, the opposing substrate 12 is arranged on the display-light exit side, and the element substrate 11 is arranged on the side of the lighting device 8. On the opposing substrate 12 on the surface facing the element substrate 11, a frame layer 120 formed of a rectangular frame-shaped light-shielding layer is formed along inner edges of four sides of the seal member 14, and an area defined by inner edges of the frame layer 120 corresponds to an image display area 100*a*. Inner edges of the upper panel portion 55 of the third frame 50 are positioned at midpoints in the width direction of the frame layer 120, and the window 550 of the third frame 50 overlaps the image display area 100*a* and an inner peripheral portion of the frame layer 120.

The liquid crystal panel 10 is configured as a liquid crystal panel of a TN (Twisted Nematic) type, an ECB (Electrically Controlled Birefringence) type, or a VAN (Vertical Aligned Nematic) type, and the pixel electrodes are formed on the element substrate 11, and a common electrode (not shown) is formed on the opposing substrate 12. When the liquid crystal panel 10 is a liquid crystal panel of an IPS (In Plane Switching) type or an FFS (Fringe Field Switching) type, the common electrode is provided on the side of the element substrate 11. The element substrate 11 may be arranged on the display-light exit side with respect to the opposing substrate 12. A light polarizing panel 18 is arranged so as to overlap an upper surface of the liquid crystal panel 10, and a lower polarizing panel 17 is arranged between a lower surface of the liquid crystal panel 10 and the lighting device 8.

In this embodiment, the element substrate 11 is larger than the opposing substrate 12. Therefore, the element substrate 11 has a protruding portion 110 protruding from an end portion of the opposing substrate 12 on the one side Y1 in the Y-axis direction, and a plurality of flexible wiring substrates 200 are connected to an upper surface of the protruding portion 110. The flexible wiring substrates 200 are connected to a circuit substrate 250 formed of a rigid substrate, and a control IC (not shown) which constitutes the image signal supply unit 270 described with reference to FIG. 1 and a light source drive IC (not shown) which constitutes the light source drive unit 280 are mounted.

Configuration of Lighting Device 8

Figure 5A:
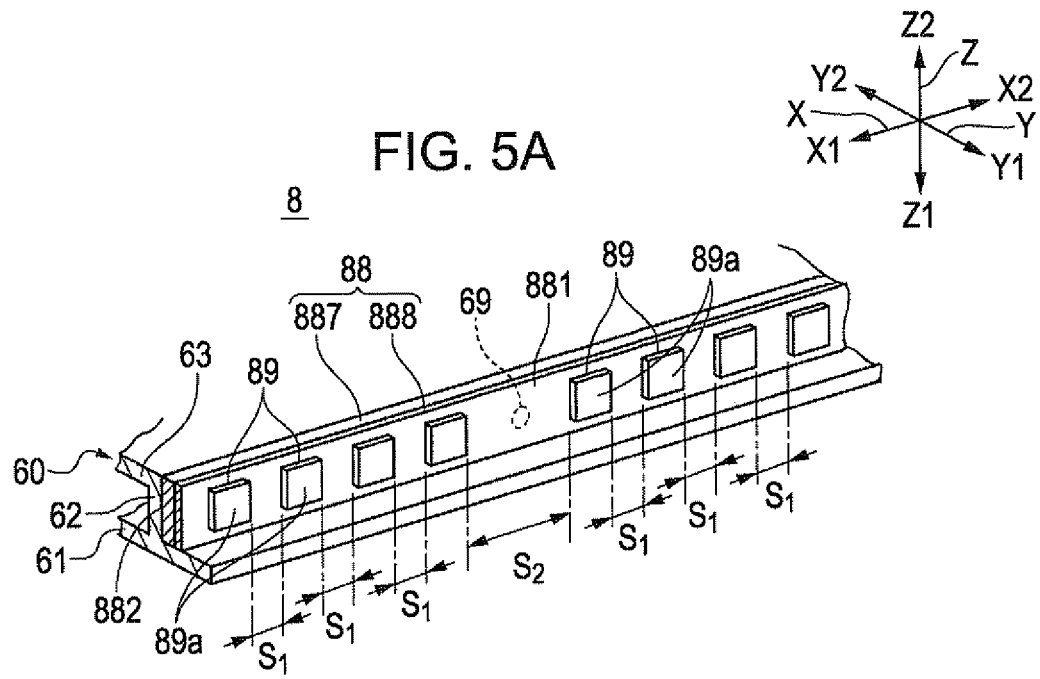
FIGS. 5A and 5B are explanatory drawings showing a configuration in the periphery of a light source substrate used in a lighting device of the liquid crystal display device according to the first embodiment of the invention.
Figure 5B:
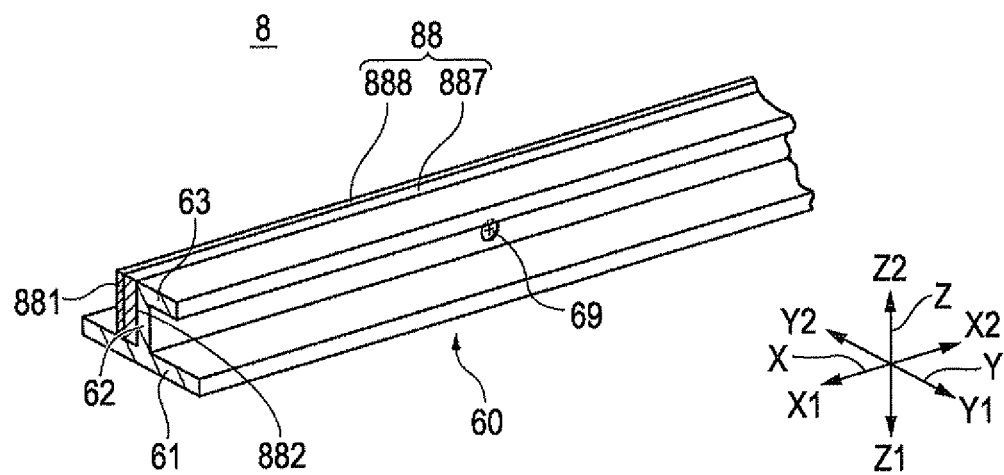

FIGS. 5A and 5B are explanatory drawings showing a configuration of a portion in the periphery of the light source substrate 88 used in the lighting device 8 of the liquid crystal display device 100 according to the first embodiment of the invention. FIG. 5A is an explanatory drawing schematically illustrating a state of a first side end surface 881 side of the light source substrate 88, and FIG. 5B schematically explanatory drawing schematically illustrating a state of a second side end surface 882 side of the light source substrate 88. Configurations of the light-emitting elements 89 and the light source substrates 88 arranged on the two side end surfaces 801 and 802 (the light incident portions 80*a*) of the light guide plate 80 facing each other in the Y-axis direction of the light guide plate 80 are the same. Therefore, the light-emitting elements 89 and the light source substrate 88 arranged on the side end surface 802 of the light guide plate 80 are shown in FIG. 5A, and the light source substrate 88 arranged on the side end surface 801 of the light guide plate 80 is shown in FIG. 5B.

As shown in FIG. 3 and FIGS. 4A and 4B, the lighting device 8 includes the light guide plate 80 arranged so as to overlap the lower surface of the liquid crystal panel 10 and the plurality of light-emitting elements 89 arranged from the one end side (the one side X1 in the X-axis direction) of the light incident portions 80*a* toward the other end side (the other side X2 in the X-axis direction) with light-emitting surfaces 89*a* facing the light incident portions 80*a* of the light guide plate 80. In this embodiment, the plurality of light-emitting elements 89 are mounted on the first side end surface 881 of the light source substrate 88 extending in the X-axis direction along the light incident portion 80*a*. The light-emitting elements 89 are LEDs (Light Emitting Diodes) emitting white light, and emit source light as diverging light.

In the lighting device 8 of this embodiment, the two side end surfaces 801 and 802 facing each other in the Y-axis direction from among the side end surfaces 801, 802, 803, and 804 of the light guide plate 80 are used as the light incident portions 80*a*. Therefore, the plurality of light-emitting elements 89 face the light-emitting surfaces 89*a* toward the two light incident portions 80*a* (the side end surfaces 801 and 802) of the light guide plate 80, and are arranged from one end side toward the other end side of each of the two light incident portions 80*a* (the side end surfaces 801 and 802). Two of the light source substrates 88 extend along the two light incident portions 80*a* (the side end surfaces 801 and 802), and the plurality of light-emitting elements 89 are mounted on the first side end surface 881 of each of the two light source substrates 88.

In this embodiment, the light guide plate 80 is a transmissive resin panel formed of an acryl resin, a polymethylstyrene resin, a polycarbonate resin, or the like, and a reflecting sheet 187 is arranged between a lower surface 80c of the light guide plate 80 (the surface opposite a light exit surface 80b/opposite surface) and the bottom panel portion 45 of the first frame 40 in a stacked manner. The resin panel used as the light guide plate 80 is formed by extrusion or injection molding.

The optical sheets such as the diffusing sheet 182 and the prism sheets 183 and 184 are arranged between the upper surface (light exit surface 80b) of the light guide plate 80 and the liquid crystal panel 10 in a stacked manner. The diffusing sheet 182 is formed of a sheet provided with a coating layer in which silica particles or the like dispersed in translucent resin such as an acrylic resin or a polycarbonate resin. In this embodiment, the two prism sheets 183 and 184 are arranged so that ridges thereof extend orthogonal to each other. Therefore, the illuminating light outgoing from the light exit surface 80b of the light guide plate 80 is diffused in all the directions by the diffusing sheet 182, and then is provided with a directional characteristic to have a peak in the direction of a front face of the liquid crystal panel 10 by the two prism sheets 183 and 184.

As described later with reference to FIG. 6 and so forth, a plurality of grooves 86 which are fine linear depressions extending in the X-axis direction as a diffusing pattern are formed in the light guide plate 80 on the lower surface 80c on which the reflecting sheet 187 is positioned. In this embodiment, the density of the grooves 86 increases the further they are from the light-emitting elements 89. Therefore, the intensity distribution of the illuminating light outgoing from the light guide plate 80 is uniformized irrespective of the distance from the light-emitting elements 89.

The bottom panel portion 45 of the first frame 40 is formed partly by a shoulder in an area overlapping the side of the light guide plate 80 where the side end surface 801 is positioned so as to secure a gap between the lower surface 80c of the light guide plate 80 and the first frame 40 and then is bent toward the light guide plate 80. In this configuration, the reflecting sheet 187 and a lower panel portion 61 of a light source supporting member 60 can be held in the gap between the lower surface 80c of the light guide plate 80 and the bottom panel portion 45. Since the bottom panel portion 45 of the first frame 40 is partly bent toward the light guide plate 80, a depression is formed on the back side of the first frame 40. Therefore, the flexible wiring substrates 200 is bent and made to extend to lower surface (back surface) of the bottom panel portion 45 of the first frame 40 and the circuit substrate 250 is arranged in the depression so as to be accommodated within the depth of the depression. Therefore, reduction in thickness of the lighting device 8 is achieved.

In this embodiment, the light source substrate 88 is arranged so that the first side end surface 881 on which the light-emitting elements 89 are mounted faces the light incident portion 80a of the light guide plate 80. Also, the light source substrate 88 has a structure in which wiring pattern or lands are provided together with an insulating layer on the first side end surface 881 side of a plate-shaped metal panel 887 (supporting panel) extending along the light incident portion 80a. Such a configuration may be realized by bonding a flexible wiring substrate 888 having a resin base material layer, the wiring pattern, and an insulating protecting layer stacked in this order to the first side end surface 881 side of the metal panel 887. Therefore, the lands on which the wiring pattern and chips of the light-emitting elements 89 are mounted are electrically insulated from the metal panel 887. In this embodiment, the metal panel 887 is formed of an aluminum panel, and the metal panel 887 secures the mechanical strength of the light source substrate 88 and functions as a radiator plate for heat generated by the light-emitting elements 89.

As shown in FIG. 3, FIGS. 4A and 4B, and FIGS. 5A and 5B, the light source supporting members 60 configured to hold the light source substrates 88 are arranged respectively on the second side end surface 882 sides of the two light source substrates 88, and the light source supporting members 60 are arranged and held between the first frame 40 and the second frame 30. In this embodiment, the light source supporting member 60 is a rod-shaped metal component extending along the second side end surface 882 of the light source substrate 88. The light source supporting member 60 includes the lower panel portion 61 overlapping the bottom panel portion 45 of the first frame 40 and a substrate supporting panel portion 62 which constitutes a wall surface projecting upward from the midpoint in the width direction of the lower panel portion 61. The light source supporting member 60 is provided with an upper panel portion 63 bent from the substrate supporting panel portion 62 to the side opposite the side where the light guide plate 80 is positioned on the upper end side of the substrate supporting panel portion 62 (the opposite side from the lower panel portion 61), and the upper panel portion 63 is fixed to at least one of the upper panel portion 55 of the third frame 50 and the upper panel portions 315 and 325 of the second frame 30 with screws or the like.

In the light source supporting member 60, a surface on the side having the light guide plate 80 of the substrate supporting panel portion 62 corresponds to a substrate holding surface 620 configured to hold the light source substrate 88. In this embodiment, the light source substrates 88 are fixed to the substrate holding surface 620 by screws 69 secured from the side of the second side end surface 882, and the screws 69 are not exposed on the first side end surface 881 of the light source substrate 88. In this state, the entire surface of the first side end surface 881 (metal panel 887) of the light source substrate 88 comes into surface contact with the substrate holding surface 620, and overlaps therewith in a tight-contact manner. The light source supporting member 60 is formed of a metal such as aluminum or iron-based metal. Therefore, the heat generated by the light-emitting elements 89 is transmitted from the metal panel 887 of the light source substrates 88 to the light source supporting member 60, and the heat of the light source supporting member 60 is transmitted to the first frame 40. Therefore, the temperature rise of the light-emitting elements 89 may be reduced.

Here, majority of the light-emitting elements 89 are arranged at first intervals $S_1$. However, the light-emitting elements 89 are arranged at second intervals $S_2$ which is larger than the first intervals $S_1$ in all of a plurality of portions in which the screws 69 are arranged. Therefore, when light is emitted from the light-emitting elements 89, a portion of the second intervals $S_2$ is a portion in which the light-emitting intensity is lower than the portion of the first intervals $S_1$. Accordingly, the light guide plate 80 has a configuration described below with reference to FIGS. 6A and 6B in this embodiment.

Configuration of Light Guide Plate 80

Figure 6A:
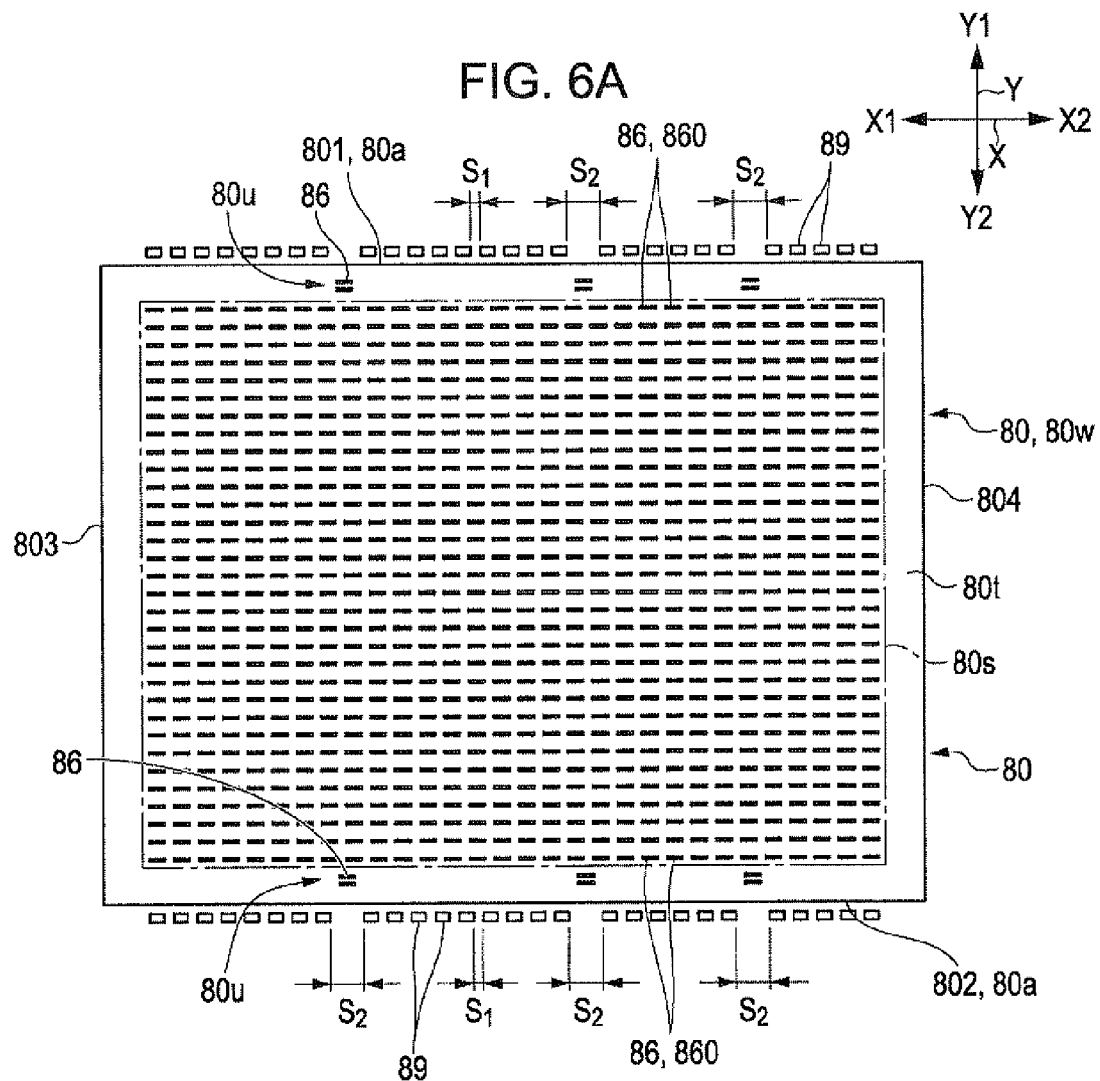
FIGS. 6A and 6B are explanatory drawings showing a light guide plate used in the lighting device of the liquid crystal display device according to the first embodiment of the invention.

FIG. 6A is an explanatory bottom view of the light guide plate 80 used in the lighting device 8 of the liquid crystal display device 100 according to the first embodiment viewed from the side of the lower surface 80c, and FIG. 68 is an explanatory bottom view of the light guide plate 80 used in the lighting device 8 of the liquid crystal display device 100 according to the first embodiment showing the second diffusing area of the light guide plate 80 in an enlarged scale. FIG. 7A is an explanatory drawing of the grooves 86 shown in FIGS. 6A and 6B illustrating a state in which light is reflected by the grooves 86, and FIG. 7B is an explanatory drawing showing directions in which the light is reflected by the grooves 86 shown in FIGS. 6A and 6B.

Figure 6B:
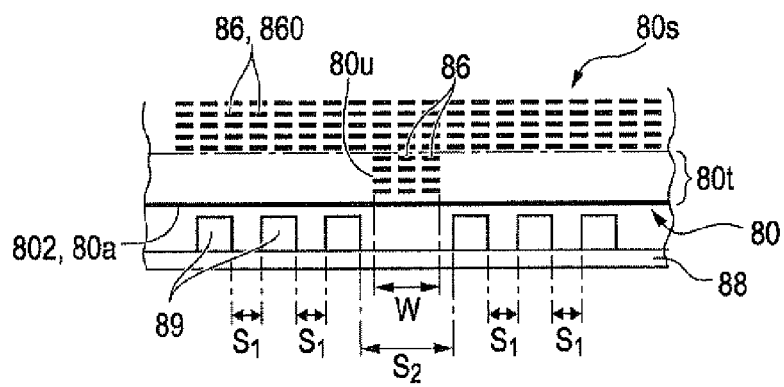
Figure 7A:
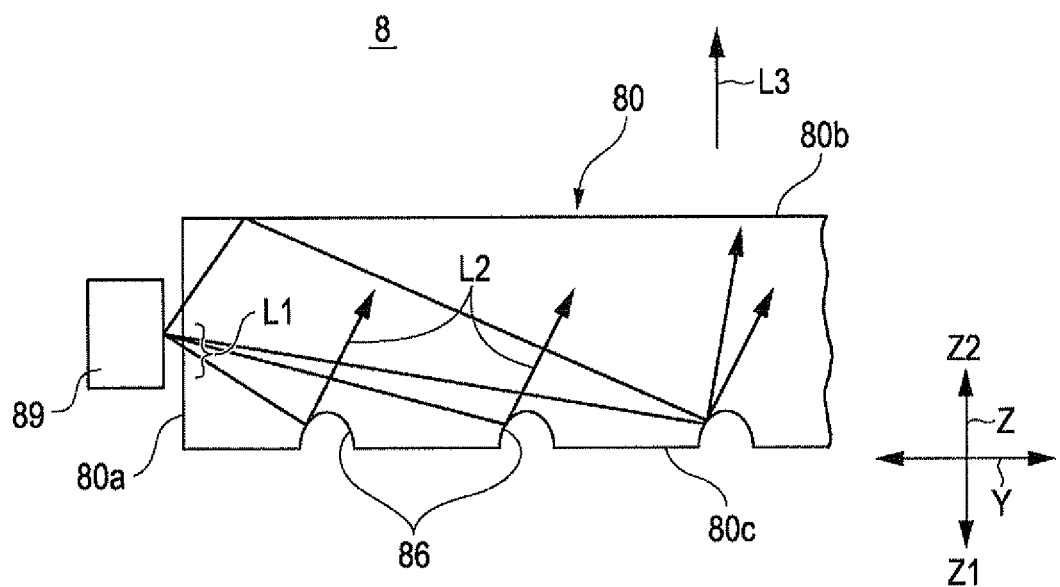
FIGS. 7A and 7B are explanatory drawings showing first grooves shown in FIGS. 6A and 6B.
Figure 7B:
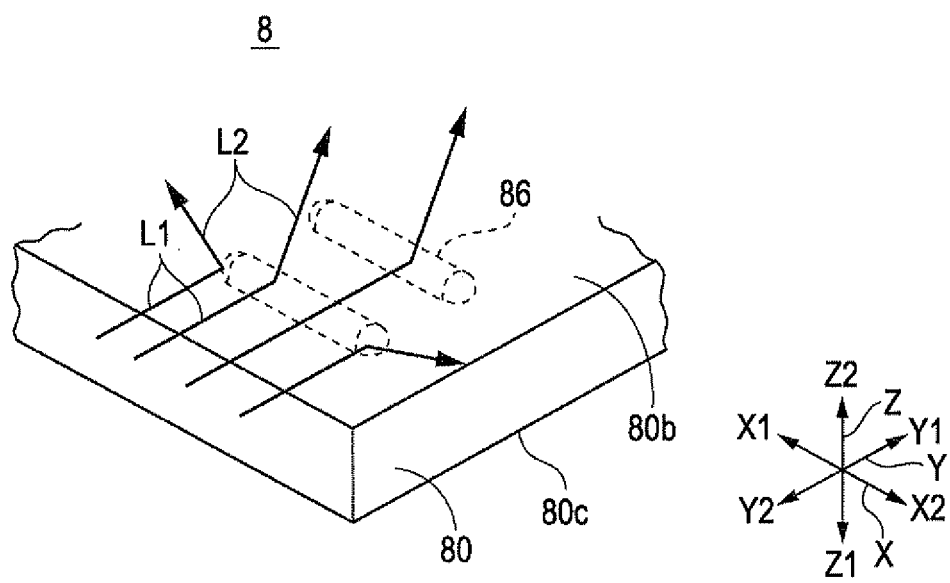

As shown in FIGS. 6A and 6B, the center area of the first diffusing area 80s of the light guide plate 80 (an area corresponding to the image display area 100a of the liquid crystal panel 10) corresponds to a first diffusing area 80s formed by the plurality of grooves 86, and a portion between the first diffusing area 80s and end portion of the light guide plate 80 corresponds to an outer edge area 80t. The first diffusing area 80s is an area letting the illuminating light go out, and overlaps with the image display area 100a of the liquid crystal panel 10. In the first diffusing area 80s, a plurality of groove rows 860 each including the plurality of grooves 86 linearly in the X-axis direction (on an extension) are arranged in parallel in the Y-axis direction and, in this embodiment, the grooves 86 are arranged equidistantly in the groove rows 860.

Second diffusing areas 80u formed partly (in parts of the areas) with the grooves 86 are provided on the outer edge area 80t of the lower surface 80c of the light guide plate 80 in this embodiment. More specifically, in the lighting device 8 of this embodiment, portions in which the plurality of light-emitting elements 89 arranged in the X-axis direction are not arranged equidistantly at regular intervals and are discontinuous, in particular, portions in which the intervals between the adjacent light-emitting elements 89 (second intervals $S_2$) are larger than the intervals between other light-emitting elements 89 (first intervals $S_1$) exist. Therefore, in this embodiment, the rectangular second diffusing areas 80u formed by the plurality of grooves 86 are provided between the portions of the second intervals $S_2$ having the light-emitting element at larger intervals and the first diffusing area 80s. In other words, the rectangular second diffusing areas 80u formed by the plurality of grooves 86 are provided between the portions of the light incident portions 80a (the side end surfaces 801 and 802) of the light guide plate 80 corresponding to the portions (second intervals $S_2$) where the intervals between the adjacent light emitting elements are set to be larger than the distance (first intervals $S_1$) between other light-emitting elements and the first diffusing area 80s. Here, a dimension W in the direction of arrangement of the light-emitting elements 89 of the second diffusing areas 80u formed by a plurality of grooves 86 is smaller than the second intervals $S_2$. In the second diffusing areas 80u, the plurality of grooves 86 constitute groove rows arranged on the same extension with the longitudinal direction thereof oriented in the X-axis direction and a plurality of groove rows are arranged in parallel in the Y-axis direction in the same manner as the grooves 86 in the first diffusing area 80s.

As shown in FIG. 7A, the grooves 86 are formed of depressions depressed on the lower surface 80c of the light guide plate 80. As shown in FIG. 7B, the grooves 86 have a groove shape in an elongated circular shape in plan view with the longitudinal direction oriented in the X-axis direction. A YZ cross section of the grooves 86 in FIG. 7A has a substantially prism shape (semi-circular or parabolic shape), and an inner bottom portion corresponding to a top portion has a semicircular shape having a curvature radius of 30 μm to 80 μm. The opening width of the grooves 86 is, for example, 100 μm to 300 μm, and the depth of the grooves 86 (the dimension in the Z-axis direction) is, for example, from 100 μm to 700 μm.

In the lighting device 8 configured in this manner, the light emitted from the light-emitting elements 89 enters from the light incident portions 80a as indicated by an arrow L1, and then proceeds in the interior of the light guide plate 80 while repeating total reflex on the light exit surface 80b or on the lower surface 80c in the interior of the light guide plate 80. Then, as indicated by an arrow L2, by the reflex in the grooves 86, as indicated by an arrow L3, the light goes out from the light exit surface 80b as illuminating light. In this case, the light reflected at end portions of the grooves 86 proceeds while diffusing and propagating in various directions, so that the uniformity of the illuminating light going out from the light exit surface 80b of the light guide plate 80 is enhanced.

Here, at the time point when the light emitted from the light-emitting elements 89 enters the light guide plate 80, the portions in which the intervals of the light-emitting elements 89 are larger than other portions (the portions of the second intervals $S_2$) are discontinuous portions having a light intensity lower than the periphery. However, when the light enters the second diffusing areas 80u of the light guide plate 80 corresponding (facing) the second intervals $S_2$, the light enters the first diffusing area 80s while exciting diffused reflex in the plurality of grooves 86 provided in the second diffusing areas 80u. Therefore, since the light diffuseness is compensated by the formation of the grooves 86 even in the portion where the light-emitting elements are arranged at the second intervals $S_2$, difference in light intensity from the periphery is alleviated. Therefore, even though there exist portions in which the light-emitting elements 89 are arranged at large intervals, the light intensity of the illuminating light going out from the light guide plate 80 may be uniformized.

Method of Manufacturing Light Guide Plate 80

Figure 8:
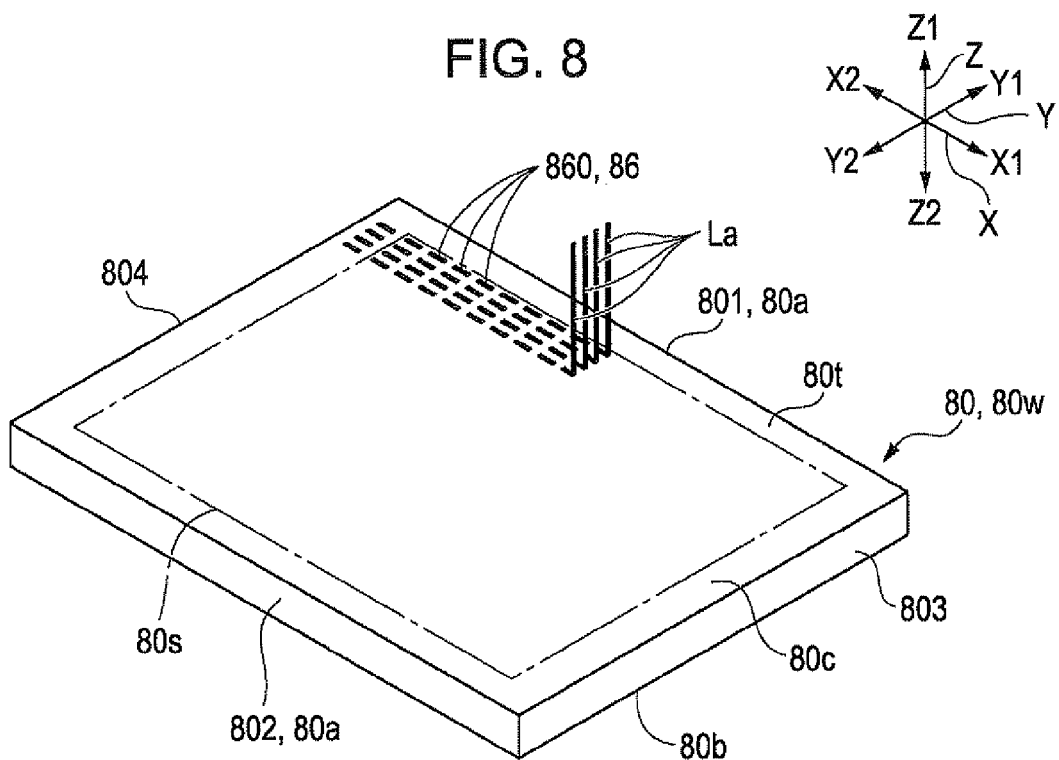
FIG. 8 is an explanatory drawing showing a method of manufacturing the light guide plate shown in FIGS. 6A and 6B.

FIG. 8 is an explanatory drawing showing a method of manufacturing the light guide plate 80 shown in FIGS. 6A and 6B.

When manufacturing the light guide plate 80 described with reference to FIGS. 6A and 6B, and FIGS. 7A and 7B, a resin panel 80w for the light guide plate is formed by extrusion or injection molding, and then the resin panel 80w is placed on an X-Y stage (not shown) so that first side end surface of the resin panel 80w (the lower surface 80c of the light guide plate 80) faces upward as shown in FIG. 8. Then, the resin panel 80w is irradiated with laser beams La of carbon dioxide laser or femtosecond laser, and a high polymer material which constitutes the resin panel 80w is melted and volatilized at the irradiated position, so that the grooves 86 are formed. In this embodiment, four of the laser beams La are generated from laser light emitted from a laser apparatus.

In this embodiment, the groove rows 860 for four rows of groove rows 860 are simultaneously formed by turning ON and OFF the four laser beams La at predetermined timings, while moving the resin panel 80w in the X-axis direction and moving the position of irradiation of the laser beams La in the X-axis direction. After the formation of the four rows of groove rows 860, another four rows of groove rows 860 are formed at position shifted to the one side Y1 in the Y-axis direction with respect to the four rows of groove rows 860 formed previously by moving the resin panel 80w in the Y-axis direction. By repeating such a process, the grooves 86 are formed entirely in the first diffusing area 80s. In this case, by adjusting the amount of movement of the resin panel 80w in the Y-axis direction, the grooves 86 may be formed at a predetermined density.

When manufacturing the light guide plate 80 in this method, in this embodiment, the portion of the outer edge area 80t in which the light-emitting elements 89 are arranged at the large second intervals $S_2$ is also irradiated with the laser beams La to form the grooves 86 on the outer edge area 80t, whereby the rectangular second diffusing areas 80u is provided as shown in FIG. 6.

Principal Effects of Embodiment

As described above, the light guide plate 80 used in the liquid crystal display device 100 and the lighting device 8 of this embodiment, the rectangular second diffusing areas 80u formed by the grooves 86 are provided in the outer edge area 80t arranged between the first diffusing area 80s having the plurality of grooves 86 (the diffusing pattern) formed thereon and the end portion of the light guide plate 80 so as to face the portion in which the light-emitting elements 89 are arranged at the second intervals $S_2$. Therefore, at the time point when the light emitted from the light-emitting elements 89 enters the light guide plate 80, the portions in which the intervals of the light-emitting elements 89 are larger than other portions are discontinuous portions having a light intensity lower than the periphery. However, at the time point when the light enters the first diffusing area 80s, the difference in light intensity from the periphery is alleviated by the grooves 86 (diffusing pattern) formed in the second diffusing areas 80u even in the portion in which the intervals of the light-emitting elements 89 are larger than other portions. Therefore, even though there exist portions in which the light-emitting elements 89 are arranged at large intervals, uniformity of the light intensity of the illuminating light going out from the light guide plate 80 may be enhanced. The grooves 86 are not formed in areas other than the second diffusing areas 80u in the outer edge area 80t, and the width w of the second diffusing areas 80u is smaller than the second intervals $S_2$. Therefore, in the outer edge area 80t, the diffused reflex is excited only in the minimum required area. Therefore, outgoing of the illumination light from unintended positions of the light guide plate 80 does not occur.

In the first diffusing area 80s, the plurality of groove rows 860 having the grooves 86 arranged linearly in the X-axis direction are provided in parallel in the Y-axis direction, and the grooves 86 are formed with the longitudinal direction oriented in the X-axis direction in the second diffusing areas 80u. Therefore, the grooves 86 may be provided in the second diffusing areas 80u in the same method as the method of providing the grooves 86 in the first diffusing area 80s. Since the grooves 86 are formed by the irradiation of the laser beams La, it is easy to form the grooves 86 in the predetermined portion (second diffusing areas 80u) in the outer edge area 80t.

Second Embodiment

Figure 9:
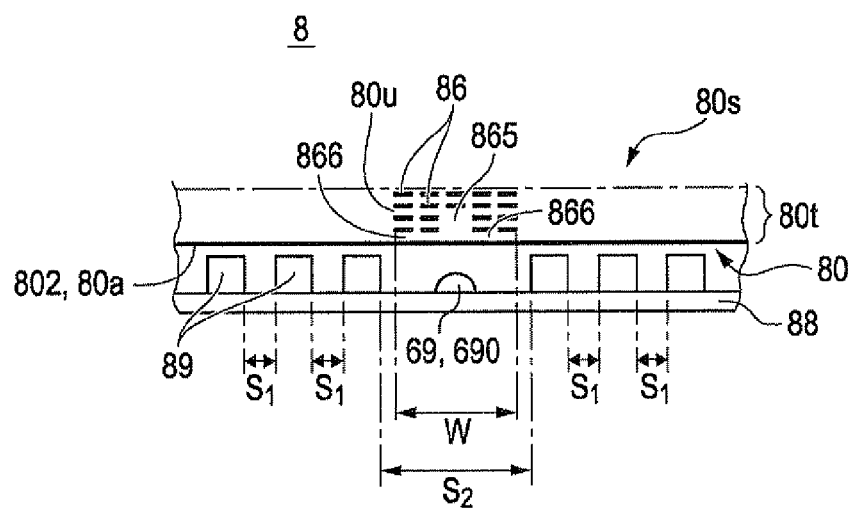
FIG. 9 is an explanatory drawing showing the light guide plate used in the lighting device of the liquid crystal display device according to a second embodiment of the invention.

FIG. 9 is an explanatory drawing showing the light guide plate 80 used in the lighting device 8 of the liquid crystal display device 100 according to a second embodiment of the invention. Basic configurations of this embodiment are the same as the first embodiment, common parts are illustrated with the same reference signs and description thereof is omitted. In FIG. 9, illustration of the grooves 86 in the first diffusing area 80s is omitted.

As shown in FIG. 9, in the second embodiment, the second diffusing areas 80u formed by the grooves 86 is provided between the portions in which the light-emitting elements 89 are provided at the large second intervals $S_2$ and the lower surface 80c in the outer edge area 80t in the first diffusing area 80s of the light guide plate 80 as in the first embodiment. The width of the second diffusing areas 80u is smaller than the second intervals $S_2$.

Here, heads 690 of the screws 69 used for the fixation of the light source substrates 88 are exposed or projected from the first side end surface 881 of the light source substrates 88 as structures. In the portions in which the heads 690 of the screws 69 exist, the reflex is excited and hence the light intensity is increased correspondingly. Therefore, an effect such that minute light-emitting elements are arranged imaginarily is brought about. Therefore, in this embodiment, portions 865 facing the end portion of the second diffusing areas 80u on the side of the heads 690 of the screws 69 (portions in which the screws 69 are exposed) are positioned on the side of the first diffusing area 80s with respect to other portion 866. In other words, a less number of the grooves 86 are formed in the second diffusing areas 80u of the light guide plate 80 facing the head portions 690 of the screws 69 (the portion in which the screws 69 are exposed) than in other area in the second diffusing areas 80u are formed, and the density of formation of the grooves 86 in the Y-axis direction is lower than in other areas. More specifically, in the second diffusing areas 80u of the light guide plate 80 facing the head portions 690 of the screws 69 (the portion in which the screws 69 are exposed), portions in which the grooves 86 are not partly formed are provided. In this manner, in this embodiment, since the end portions of the second diffusing areas 80u are retracted toward the first diffusing area 80s at portions facing the heads 690 of the screws 69 of the light guide plate (the portion in which the screws 69 are exposed), even when the heads 690 of the screws 69 are exposed, the difference in light intensity from the periphery may be alleviated efficiently.

Third Embodiment

Figure 10A:
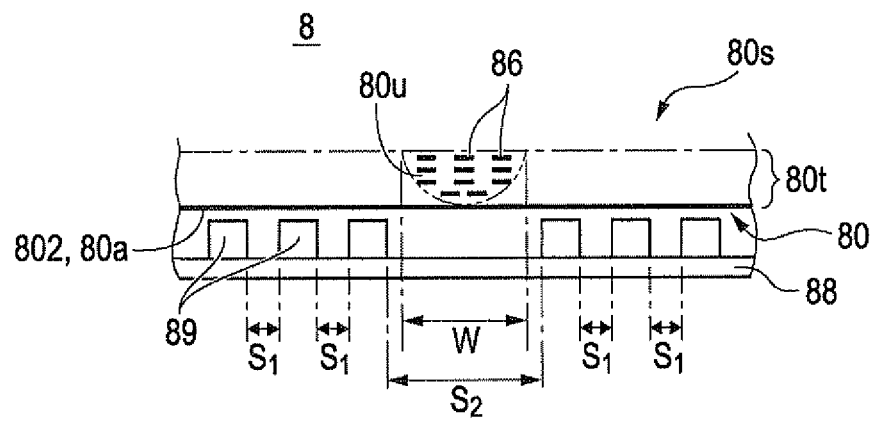
FIGS. 10A and 10B are explanatory drawings showing the light guide plate used in the lighting device of the liquid crystal display device according to a third embodiment of the invention.
Figure 10B:
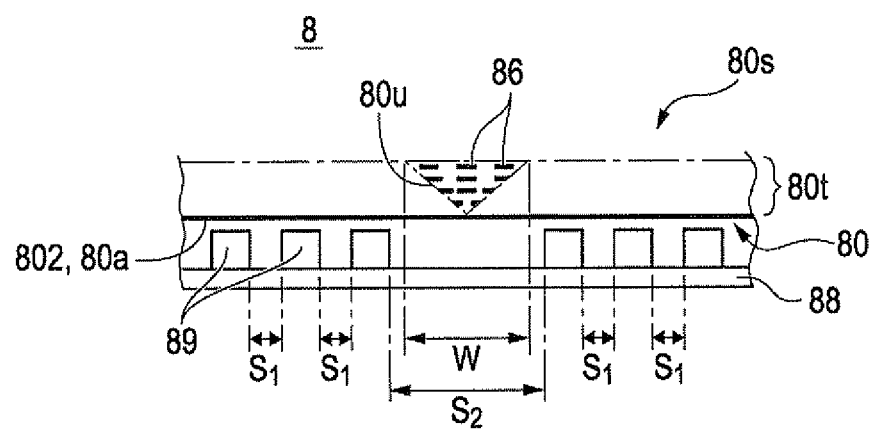

FIG. 10A is an explanatory drawing of the light guide plate 80 used in the lighting device 8 of the liquid crystal display device 100 according to a third embodiment showing a configuration in which the second diffusing areas 80u have a semi-circular shape, and FIG. 10B is an explanatory drawing of the light guide plate 80 used in the lighting device 8 of the liquid crystal display device 100 according to the third embodiment showing a configuration in which the second diffusing areas 80u are formed into a triangular shape or a trapezoidal shape. Basic configurations of the third embodiment are the same as the first embodiment, common parts are illustrated with the same reference signs and description thereof is omitted. In FIG. 10, illustration of the grooves 86 in the first diffusing area 80s is omitted.

As shown in FIGS. 10A and 10B, in this embodiment, the second diffusing areas 80u formed by the grooves 86 are provided between the portions in which the light-emitting elements 89 are provided at the large second intervals $S_2$ and the first diffusing area 80s in the outer edge area 80t in the lower surface 80c of the light guide plate 80 as in the first embodiment. The width of the second diffusing areas 80u is smaller than the second intervals $S_2$.

As the second diffusing areas 80u, the rectangular second diffusing areas 80u are formed in the first embodiment. However, the second diffusing area 80u shown in FIG. 10A has a semi-circular shape having its chord facing the first diffusing area 80s. The second diffusing area 80u shown in FIG. 10B has a trapezoidal shape or a triangular shape with bottom side facing the first diffusing area 80s. In other words, in the both of the second diffusing areas described above, the formation of the grooves 86 is gradually reduced as it gets closer to the light incident portion 80a (the side end surface 802), and an outer edge of the corresponding area (an imaginary outline of the area) constitutes an apex in the width W in the direction of arrangement of the light-emitting elements 89 in the second diffusing areas 80u. In this configuration, the width W of the second diffusing area 80u is larger on the side of the first diffusing area 80s and is narrower on the side of the light incident portion 80a. Therefore, in the second diffusing area 80u, diffusion of light on the side of the light incident portion 80a is reduced, while the diffusion of light is achieved sufficiently at positions near the first diffusing area 80s. Therefore, at the time point when the light enters the first diffusing area 80s, the difference in light intensity from the periphery may be alleviated efficiently even in the portion in which the intervals of the light-emitting elements 89 are larger than other portions.

Other Embodiments

In the first to the third embodiments described above, the grooves 86 (linear grooves) are provided as the diffusing pattern. However, the invention may be applied to the light guide plate 80 in which white dots or minute prism-type projections are employed as the diffusing pattern.

In the first to the third embodiments described above, the positions where the screws 69 are secured are provided at the second intervals $S_2$. However, when a plurality of the light source substrates 88 are used, the invention may be applied when the intervals of the light-emitting elements 89 between the adjacent light source substrates 88 are the second intervals $S_2$.

In the first to the third embodiments described above, both of the side of the side end surface 801 of the light guide plate 80 and the side of the side end surface 802 of the light guide plate 80 are the light incident portions 80*a*. However, the invention may be applied to the liquid crystal display device 100 in which only one of the side end surfaces 801 and 802 is the light incident portion 80*a*.

In the first to the third embodiments described above, the first side end surfaces 881 of the light source substrates 88 face the light incident portions 80*a* of the light guide plate 80. However, the invention may be applied to the liquid crystal display device 100 having a configuration in which the first side end surfaces 881 of the light source substrates 88 are orthogonal to the light incident portions 80*a* of the light guide plate 80.

Example of Mount on Electronic Apparatus

In the embodiments described above, the liquid crystal television is exemplified as the electronic apparatus 2000 having the liquid crystal display device 100 mounted thereon. However, the liquid crystal display device 100 in which the invention is applied to a display unit of the electronic apparatus such as displays of a personal computer, Digital Signage, a car navigation apparatuses, a portable information terminal in addition to the liquid crystal television.

The entire disclosure of Japanese Patent Application No.: 2011-161709, filed Jul. 25, 2011 is expressly incorporated by reference herein.

What is claimed is:

1. A lighting device comprising:
a light guide plate which includes a first main surface, a second main surface which is opposite to the first main surface, and a plurality of side end surfaces each of which intersect with the first main surface and the second main surface; and
a plurality of light-emitting elements arranged along a first side end surface among the plurality of side end surfaces; wherein
the first main surface includes a first diffusing area on which a plurality of first diffusing patterns are formed and an outer edge area arranged between the first diffusing area and the first side end surface,
the plurality of light emitting elements include a first light emitting element, a second light emitting element, and a third light emitting element,
the first light emitting element is adjacent to the second light emitting element with a first interval and the second light emitting element is adjacent to the third light emitting element with a second interval which is larger than the first interval, and
a second diffusing area formed corresponding to the second interval on the outer edge area, a dimension of the second diffusing area in a direction of arrangement of the light-emitting elements is smaller than the second interval, and no diffusing area is formed corresponding to the first interval on the outer edge area.

2. The lighting device according to claim 1, wherein the second main surface is a light emission surface.

3. The lighting device according to claim 2, wherein a plurality of second diffusing patterns are formed on the second diffusing area.

4. The lighting device according to claim 3, wherein the plurality of first diffusing patterns are composed of a plurality of first grooves and the plurality of second diffusing patterns are composed of a plurality of second grooves,
a plurality of groove rows each including the plurality of first grooves arranged linearly in a first direction extending in a plane of the first diffusing area are arranged in parallel in a second direction intersecting with the first direction in the plane of the first diffusing area, and
the plurality of second grooves are formed in the second diffusing area with a longitudinal direction thereof oriented in the first direction.

5. The lighting device according to claim 4, wherein the first direction is parallel to the first side end surface.

6. The lighting device according to claim 4, wherein the light guide plate with the plurality of first grooves and the plurality of second grooves are formed by irradiating a resin plate with a laser beam.

7. The lighting device according to claim 1, wherein the plurality of light emitting elements further include a fourth light emitting element which is adjacent to the third light emitting element with the first interval.

8. The lighting device according to claim 1, wherein the plurality of light-emitting elements arranged along the first side end surface are divided into at least two groups,
the plurality of light-emitting elements arranged along the first side end surface are arranged with the first interval in each of the groups, and
the second light emitting element and the third light emitting element belong to different groups.

9. The lighting device according to claim 1, wherein the first diffusing area is surrounded by the outer edge area on the first main surface.

10. The lighting device according to claim 1, wherein the second diffusing area has a rectangular shape.

11. The lighting device according to claim 1, wherein the plurality of light-emitting elements are provided on a first side end surface side of a light source substrate,
a structure projecting from the first side end surface side of the light source substrate exists in a region corresponding to a part of the second diffusing area, and
the second diffusing area includes a first end portion and a second end portion on a side which is opposed to the structure, the first end portion being opposed to the region, and the first end portion being positioned closer to the first diffusing area than the second end portion.

12. The lighting device according to claim 1, wherein the second diffusing area has a semi-circular shape with a chord thereof facing the first diffusing area.

13. The lighting device according to claim 1, wherein the second diffusing area has a trapezoidal shape or a triangular shape with a bottom side thereof facing the first diffusing area.

14. A liquid crystal display device having the lighting device according to claim 1, further comprising:
a liquid crystal panel arranged on the second main surface of the light guide plate.

15. An electronic apparatus comprising: the liquid crystal display device according to claim 14.

16. A lighting device comprising:
a light guide plate which includes a first main surface, a second main surface which is opposite to the first main surface, and a plurality of side end surfaces each of which intersect with the first main surface and the second main surface;
a plurality of light-emitting elements arranged along a first side end surface among the plurality of side end surfaces; and
a light source substrate including a light source mounting surface on which the plurality of light-emitting elements are mounted; wherein
the first main surface includes a first diffusing area on which a plurality of first diffusing patterns are formed and an outer edge area arranged between the first diffusing area and the first side end surface,
the plurality of light emitting elements includes a first light emitting element, a second light emitting element, and a third light emitting element,
the first light emitting element is adjacent to the second light emitting element with a first interval and the second light emitting element is adjacent to the third light emitting element with a second interval which is larger than the first interval,
a second diffusing area formed corresponding to the second interval on the outer edge area, a dimension of the second diffusing area in a direction of arrangement of the light emitting elements is smaller than the second interval, and no diffusing area is formed corresponding to the first interval on the outer edge area, and
a structure projecting from the light source mounting surface of the light source substrate exists in a region corresponding to a part of the second diffusing area, the structure being different from the plurality of light-emitting elements.

17. A lighting device comprising:
a light guide plate which includes a first main surface, a second main surface which is opposite to the first main surface, and a plurality of side end surfaces each of which intersect with the first main surface and the second main surface; and
a plurality of light-emitting elements arranged along a first side end surface among the plurality of side end surfaces; wherein
the first main surface includes a first diffusing area on which a plurality of first diffusing patterns are formed and an outer edge area arranged between the first diffusing area and the first side end surface,
the plurality of light emitting elements include a first light emitting element, a second light emitting element, and a third light emitting element,
the first light emitting element is adjacent to the second light emitting element with a first interval and the second light emitting element is adjacent to the third light emitting element with a second interval which is larger than the first interval,
a second diffusing area formed corresponding to the second interval on the outer edge area, a dimension of the second diffusing area in a direction of arrangement of the light-emitting elements is smaller than the second interval, and no diffusing area is formed corresponding to the first interval on the outer edge area, and
a fixing structure disposed between the second light emitting element and the third light emitting element, the fixing structure existing in a region corresponding to a part of the second diffusing area, the fixing structure being different from the plurality of light-emitting elements.

* * * * *